(12) United States Patent
Thomas

(10) Patent No.: US 10,902,505 B2
(45) Date of Patent: Jan. 26, 2021

(54) AUTOMATED ASSISTANCE IN RETAIL DECISIONS

(71) Applicant: NCR Corporation, Duluth, GA (US)

(72) Inventor: Erika Thomas, Frisco, TX (US)

(73) Assignee: NCR Corporation, Atlanta, GA (US)

( * ) Notice: Subject to any disclaimer, the term of this patent is extended or adjusted under 35 U.S.C. 154(b) by 548 days.

(21) Appl. No.: 14/523,352

(22) Filed: Oct. 24, 2014

(65) Prior Publication Data

US 2016/0117757 A1    Apr. 28, 2016

(51) Int. Cl.
*G06Q 30/02* (2012.01)
*G06Q 30/06* (2012.01)

(52) U.S. Cl.
CPC ..... *G06Q 30/0639* (2013.01); *G06Q 30/0269* (2013.01); *G06Q 30/0641* (2013.01)

(58) Field of Classification Search
CPC ........ G06Q 30/00; G06Q 30/02; H04W 4/023
USPC ........ 705/14.39, 26.962; 455/456.3
See application file for complete search history.

(56) References Cited

U.S. PATENT DOCUMENTS

| | | | | |
|---|---|---|---|---|
| 2002/0065713 A1* | 5/2002 | Awada | ............... | G06Q 30/0239 705/14.39 |
| 2009/0104920 A1* | 4/2009 | Moon | ................... | G06Q 30/02 455/456.3 |
| 2012/0209711 A1* | 8/2012 | Brindisi | ............. | G06Q 30/0603 705/14.53 |
| 2013/0125005 A1* | 5/2013 | French | ................... | G06F 16/951 715/738 |
| 2013/0268409 A1* | 10/2013 | Chhajlani | .......... | G06Q 30/0601 705/26.62 |
| 2014/0315584 A1* | 10/2014 | Cheng | ................... | H04W 4/023 455/456.3 |
| 2015/0279175 A1* | 10/2015 | Hyde | ................... | G06Q 10/087 340/815.4 |

OTHER PUBLICATIONS

D Chakraborty, K Dasgupta, S Mittal, A Misra, A Gupta, E Newmark, C Oberle, Businessfinder: harnessing presence to enable live yellow pages for small, medium and micro mobile businesses, IEEE Comm Magazine (vol. 45, Issue: 1 pp. 14 4-151) (Year: 2007).*

* cited by examiner

*Primary Examiner* — Marilyn G Macasiano
(74) *Attorney, Agent, or Firm* — Schwegman, Lundberg & Woessner

(57) ABSTRACT

User-defined criterion defines goods and services of interest to a user. An aggregated listing of the goods and services is generated that spans multiple retailers within a geographic range of a current location of the user. The aggregating listing is presented to the user for making a retail decision.

17 Claims, 4 Drawing Sheets

AUTOMATED ASSISTANCE IN RETAIL DECISIONS

BACKGROUND

Eating out in a location that one is unfamiliar with is challenging. This is because most searches associated with mobile applications, navigation systems, or browsers are based on the types of cuisines or names of restaurants and not based on particular types of food that may be desired.

What typically happens is one finds a cuisine or restaurant that may have the type of food desired (or may not), and then one locates a restaurant website having the cuisine and manually views the menu of that restaurant. If the desired food is not there, another restaurant's site and menu are inspected for the desired food. This process continues until one finds the food of interest.

Finding a desired food to eat is even more challenging when two or more individuals are traveling together, each with a different taste or cuisine in mind. The group (two or more individuals) may each begin searching for a restaurant menu that can accommodate the tastes of everyone in the group.

If one is using a phone or other mobile device, the task of locating desired food for one person or a group or people can be even more difficult because there are a variety of different mobile apps and web browsers each offering slightly different mechanisms to locate the desired food and each of which may interfere with finding the desired food with advertisements to restaurants, which may be of no interest to an individual and which may not even have the desired food that the individual wants.

As one can see, when one is away from their hometown for pleasure or work, finding acceptable food to eat for one person or a group of people is very challenging and time consuming to say the least.

Therefore, there is a need for improved automated assistance in making retail decisions particularly with respect to selecting a restaurant for one person or a group of people that wish to dine together

SUMMARY

In various embodiments, techniques for providing automated assistance in making retail decisions are presented. According to an embodiment, a method for providing automated assistance in making retail decisions is provided.

Specifically, a request for a good is received and a listing of goods that spans multiple retailers within a geographical range of the user is aggregated. Next, the listing is delivered in a user-defined priority order to a device for viewing by the user in making a retail decision.

DETAILED DESCRIPTION

Figure 1:
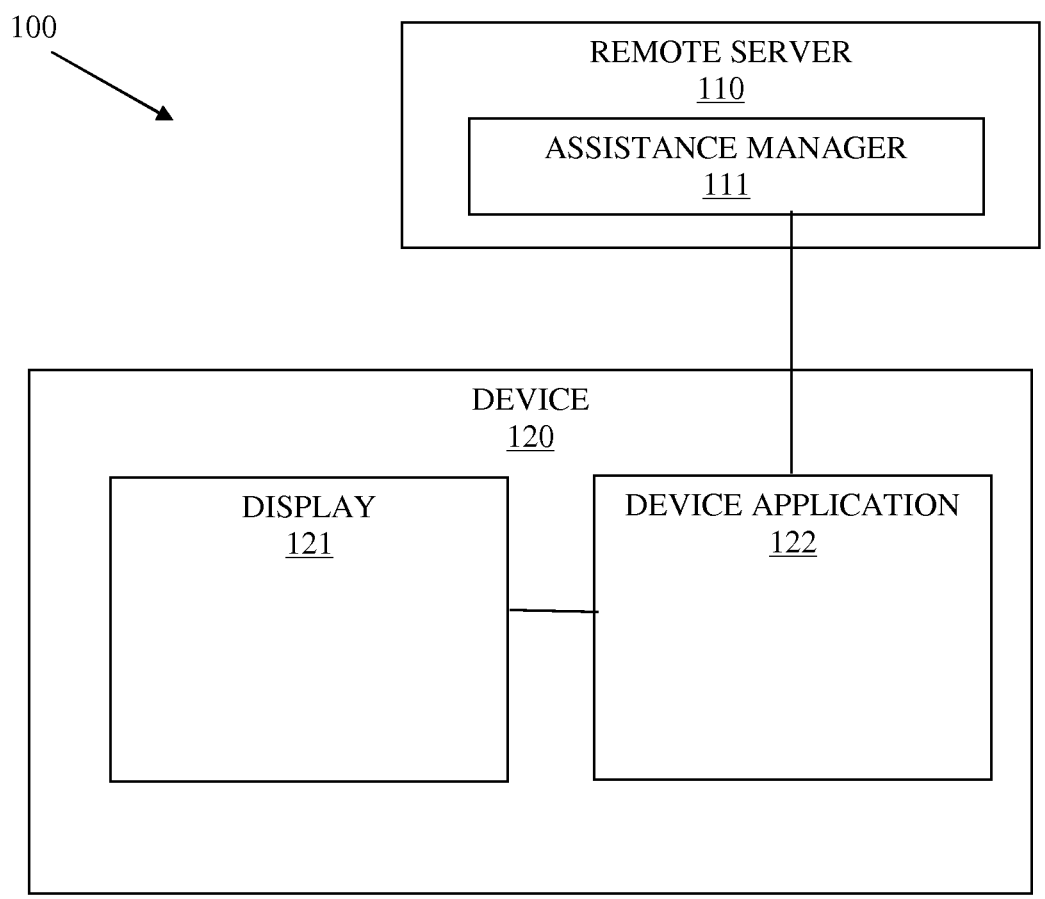
FIG. 1 is a diagram of a retail service system for providing automated assistance in making retail decisions, according to an example embodiment.

FIG. 1 is a diagram of a retail service system 100 for providing automated assistance in making retail decisions, according to an example embodiment. The components of the retail service system 100 are shown in greatly simplified form with only those components shown necessary for the understanding of the various embodiments of the invention.

The retail service system 100 includes a remote server 110 and a device 120. The remote server 110 includes an assistance manager 111 that executes on one or more processors of the remote server 110 as executable instructions. The device 120 includes a display 121 and a device application 122. The device application 122 executes on one or more processors of the device 120.

In an embodiment, the device 120 is a mobile device, such as but not limited to: a phone, a tablet, a laptop, and a wearable processing device. The mobile device operated by a consumer.

In an embodiment, the device 120 is a kiosk.

In an embodiment, the device 120 is a Point-Of-Sale (POS) device operated by the consumer or an agent of an enterprise.

The assistance manager 111 provides connections (through the remote server 110) to the device application 122, via the mobile device 120. The connections occur wirelessly using one or more of: Bluetooth®, Wi-Fi, and Cellular.

The device application 122 presents a search interface to the user (may also be referred to herein as a consumer or a customer) via the display 121 (may be touchscreen or user other input mechanisms (keyboard, etc.).

In an embodiment, a consumer may use the interface of the device application 122 to register a profile for the consumer. Registration of the profile can be based on an identifier for the consumer and/or the mobile device 120. Some identifiers for the consumer can include an email address, a last name, a user-selected name, a phone number, a loyalty number for a particular retailer, and the like. The profile includes a variety of information pertinent to and customized by the consumer, such as but not limited to: desired foods, prioritized foods, desired goods, prioritized goods, desired restaurants, prioritized restaurants, desired services, prioritized services, foods to avoid, goods to avoid, restaurants to avoid, services to avoid, range for searching from a current location of the device 120, and the like.

The features of the embodiments for the retail service system 100 will now be discussed with a variety of example scenarios for purposes of comprehension and to illustrate some features of the invention.

Suppose a consumer has previously registered a profile with the assistance manager 111 using the device application 122 to identify a priority list of foods as baked fish, chicken, salad; identify a list of foods to avoid as spicy, Thai food, desserts with nuts; and to identify a range of searching of 2 miles.

Now suppose the consumer is traveling away from her home in Frisco, Tex. to visit Cincinnati, Ohio on business. During a break, she wishes to find a restaurant that meets her profile. She accesses the interface of the device application 122 on her mobile device 120 (phone) and requests a menu for food choices within 2 miles of her mobile device's current location. The device application 122 communicates with the assistance manager 111 over a cellular connection. The assistance manager 111 stores current menus for restaurants and aggregates those food items that meet the consumer's profile into a single aggregated menu from just those restaurants within 2 miles of the consumer. This is aggregated menu is pushed from the assistance manager 111 to the display 121 of the device 120 through the device application 122 for the consumer to view. Each entry in the aggregated menu can include a variety of useful information such as: name of the restaurant providing the food item, estimated or actual expense of the food item, ratings for the food time, distance from current location of the device 120 to the restaurant having the food item, and, perhaps, directions to that restaurant from the current location of the device 120. The consumer can browse the aggregated menu that includes food items from multiple different restaurants and view the additional information and make a selection. This is done without inspecting the actual menus of multiple different restaurants but viewing a customized menu that is tailored to the customer (based on the profile) and the customized menu is a selected aggregation of multiple menus from multiple restaurants.

In another case, suppose the customer is in Cincinnati with a friend and that friend has different tastes in food then the customer. The device application 122 may permit the customer to manually enter a profile for the friend or acquire the friend's profile automatically through a Near Field Communication (NFC) tap or Bluetooth® connection. Other means can be used to connect or associated multiple profiles as well, such as social media platforms (Facebook™, Twitter™, LinkedIn™, and others). The friends profile can be submitted as part of the request for a restaurant from the device application 122 of the customer to the assistance manager 111. The assistance manager 111 then aggregates a menu based on the profile of the customer and the profile of the friend, and presents the menu that complies with both profiles.

It is noted that more than two individual profiles can be used, such that any size group can submit profiles for a menu that agrees with everyone in the group.

For example, consider two individuals going to lunch, each have a phone (mobile device 120) and each having the device application 122. The two individuals can associate their two profiles, such as through an NFC bump or other mechanism and each individual receives back from the assistance manager 111 a list that overlaps their two individual preferences for food (including likes and dislikes for each). Each individual can user their device application 122 to select a few agreeable choice to him or her and re-submit through their device application 122 to the assistance manager 111, the assistance manager 111 then provides through the device applications 122 of each individual one or more suggestions for lunch. Should there be no overlapping choices to present to the individuals, the device application 122 can suggest that the two continue to revise choices (and/or expand their acceptable geographical range) until an agreeable overlap in a lunch choice is arrived at between the two.

Also, a profile need not be used. That is, the device application 122 can take food choices and food dislikes as part of the request for a restaurant that produces a menu from the local restaurants combined as an aggregated menu for consumer inspection.

Moreover, each entry in the aggregated menu that spans multiple different restaurants can include links and features for each food item and/or restaurant to show images of the food from the restaurant. Moreover, the device application 122 can include offers or advertisements for restaurants around a periphery of the aggregated menu. Restaurants (retailers) can subscribe to the assistance manager 111 to have their offers or advertisements placed in the aggregated menu when it is related to food of interest to the consumer. Since, the retailer is assured that the aggregated menu being presented to the consumer is of interest to the consumer and the consumer is likely to make a retail decision and purchase, the retailer is more likely to also pay higher prices for the advertisements and consumer offers dynamically presented with the aggregated menu.

So, the assistance manager 111 can have two interfaces one for interacting with instances of the device application 122 and one for interacting with retailers to acquire offers, advertisements, and payments for such offers and advertisements. Tracking of the offers and advertisements may also be used based on when the consumer activates an advertisement within the device application 122 or redeems an offer at a particular retailer; such a scenario can also generate additional revenues for the enterprise providing the assistance manager 111.

The consumer receives information directly relevant to what the consumer is interested in at a particular point in time and based on the consumers defined criteria or existing registered profile. This makes it more likely that the consumer will adopt and use the device application 122 and the more widespread adoption and use, the more retailers will want to pay for directed advertisements or consumer offers to entice a consumer to make a decision for doing business with the retailers.

It is noted that although examples were presented with respect to the restaurant business and food choices, other embodiments of the invention can be used for any type of retail good or retail service, where the assistance manager 111 generates an aggregated selection of such goods or services based on consumer-defined criteria or a registered consumer-profile.

For example, suppose a consumer is out of town and is in need of a new shirt in a specific size, a toiletry, a medicine, and the like. The device application 122 can present an interface where the need of the consumer can be entered as a search. The consumer's profile or the search terms can provide a geographical range for the current location of the device 120 for which the search is to be conducted. The assistance manager 111 conducts the search and returns the names of specific retailers having the item searched for along with distance from the consumer, and, perhaps, the cost of the time at each retailer. In some cases, the search can be for a service, such as a check cashing store, a spa treatment, and the like.

In an embodiment, the assistance manager 111 includes interfaces to various retailers that permit a user through the device application 122 to see when desired goods are in or out of inventory and to see current pricing for the goods. Moreover, in an embodiment, the assistance manager 111 through the device application 122 can permit the user to place an order, such as a food order (but can be any good, as described herein), directly with a particular retailer through the device application 122 and its interaction with the assistance manager 111 (which then interacts with that retailer's ordering and/or purchasing systems).

In an embodiment, the consumer's profile can be limited to just those available choices of goods from retailers within the defined geographical regional that are in stock or inventory and actually available to the consumer.

The above-discussed embodiments and other embodiments are now discussed with reference to the FIGS. 2-4.

Figure 2:
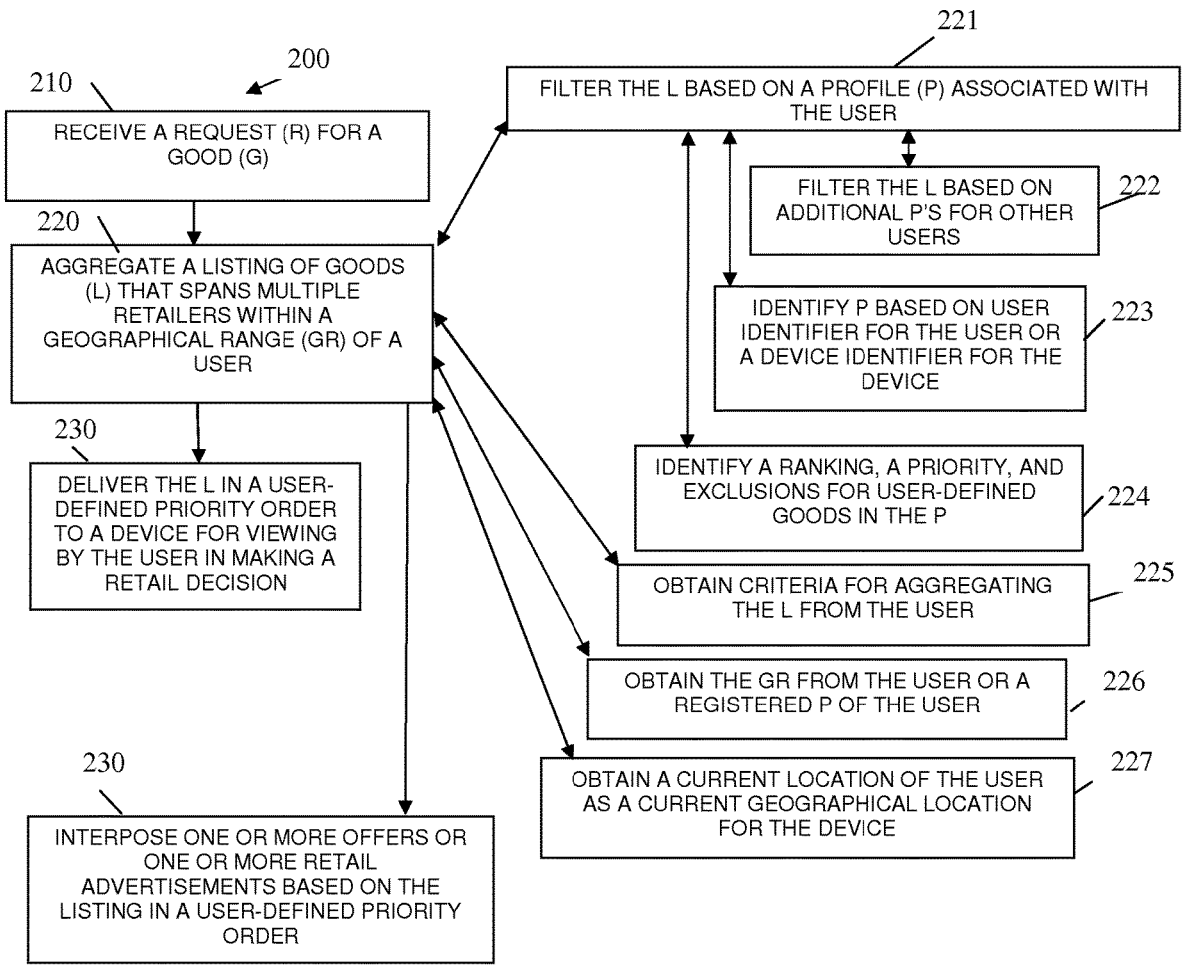
FIG. 2 is a diagram of a method for providing automated assistance in making retail decisions, according to an example embodiment.

FIG. 2 is a diagram of a method 200 for providing automated assistance in making retail decisions, according to an example embodiment. The method 200 (hereinafter "retail aggregation manager") is implemented as instructions programmed and residing in memory or on a non-transitory computer-readable (processor-readable) storage medium and executed by one or more processors of a server. The processors are specifically configured and programmed to process the retail aggregation manager. The retail aggregation manager may also operate over one or more networks. The networks are wired, wireless, or a combination of wired and wireless.

In an embodiment, the retail aggregation manager is the assistance manager 111 of the FIG. 1.

At 210, the retail aggregation manager receives a request for a good. It is noted that a "good" as used herein may be considered a "good" or a "service." In an embodiment, the good is a food item or food type as discussed above with reference to the FIG. 1. The request is received from a device, such as the device 120 of the FIG. 1, via the device application 122 and initiated by a user/consumer. In an embodiment, the good is a service. In an embodiment, the good is a retail product. In an embodiment, the good does not include fuel. In an embodiment, the good does not include entertainment services. In an embodiment, the good does not include fuel and also does not include entertainment services.

At 220, the retail aggregation manager aggregates a listing of goods that spans multiple retailers within a geographical range of a user. That is, the listing is goods from multiple retailers, such as food items from multiple menus as described above in the examples of the FIG. 1.

According to an embodiment, at 221, the retail aggregation manager filters the listing of goods based on a profile associated with the user. These filters can be based on ratings, average length of time to be served, reputations of certain retailers, things the user is allergic to, things the user dislikes, things the user likes, etc.

In an embodiment of 221 and at 222, the retail aggregation manager filters the listing of goods based on one or more additional profiles associated with other users. This is a situation where a group is looking to go together to get goods, such as having a meal together where each of the members of the group have different tastes defined in the profiles. This was also discussed above with respect to the FIG. 1.

In an embodiment of 221 and at 223, the retail aggregation manager identifies the profile based on a user identifier for the user or a device identifier for the device. The variety of user identifiers was discussed above with respect to the FIG. 1. The device identifier can be a phone number, a media access device (MAC) identifier, etc.

In another embodiment of 221 and at 224, the retail aggregation manager identifies a ranking, a priority, and exclusions for user-defined goods in the profile. That is each good can have a ranking, a priority, or can be excluded and identified as such in the profile.

In an embodiment, at 225, the retail aggregation manager obtains the criteria for aggregating the listing of goods from the user. That is, the user supplies the criteria with the request received at 210.

In still another case, at 226, the retail aggregation manager obtains the geographic range from the user or a registered profile of the user.

In another situation, at 227, the retail aggregation manager obtains the current location of the user as a current geographical location resolved for the device.

At 230, the retail aggregation manager delivers the listing in a user-defined priority order to a device for viewing by the user in making a retail decision. The listed goods are provided in the order from what is available from retailers within the geographical range of the user and the goods defined by the user.

Figure 3:
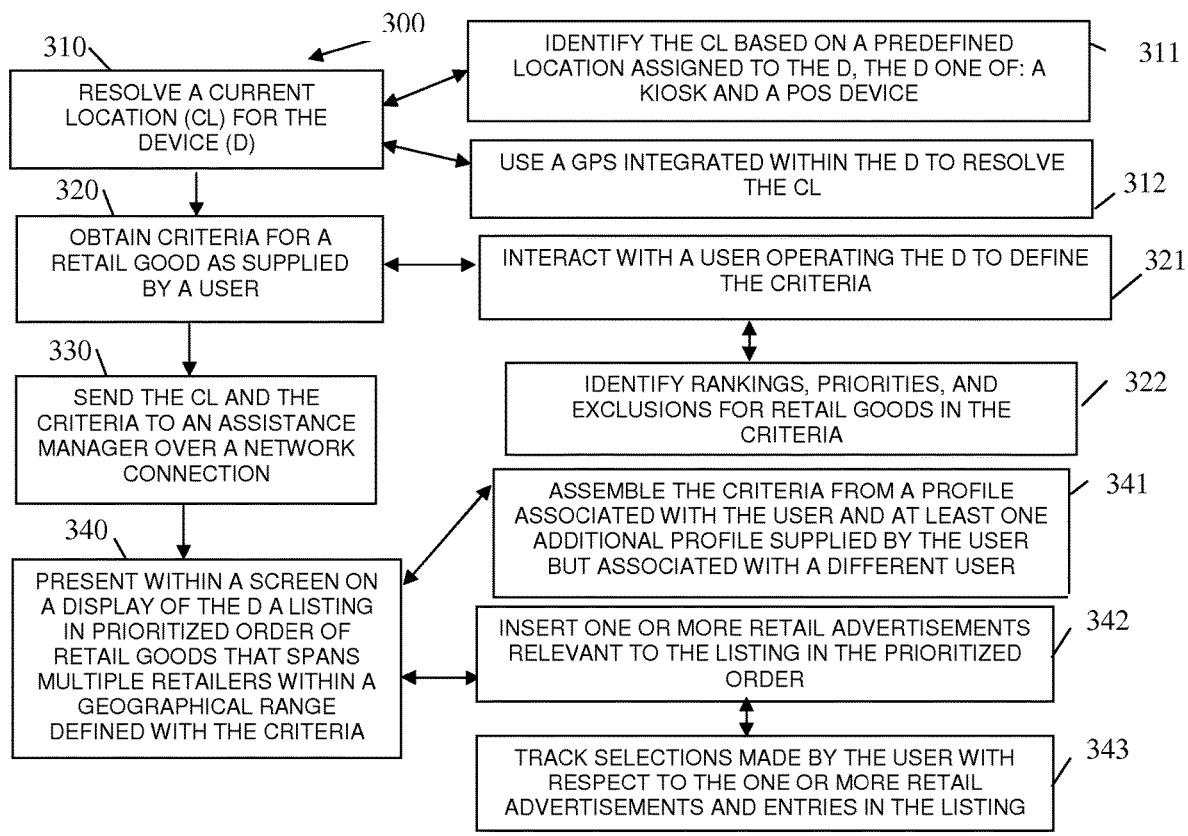
FIG. 3 is a diagram of another method for providing automated assistance in making retail decisions, according to an example embodiment.

FIG. 3 is a diagram of another method 300 for providing automated assistance in making retail decisions, according to an example embodiment. The method 300 (hereinafter "device agent") is implemented as instruction and programmed within memory or a non-transitory computer-readable (processor-readable) storage medium that executes on one or more processors of a device; the processors of the device are specifically configured to execute the device agent. The device agent may also be operational over one or more networks; the networks may be wired, wireless, or a combination of wired and wireless.

The device agent interacts with the retail aggregation manager presented above with reference to the method 200 of the FIG. 2.

In an embodiment, the device agent is the device application 121 of the FIG. 1.

At 310, the device agent resolves a current location for the device (the device is executing the device agent).

In an embodiment, at 311, the device agent identifies the current location based on a predefined location assigned to the device. Here, the device is one of: a kiosk and a POS device.

In an embodiment, at 312, the device agent identifies the current location using a Global Positioning Satellite (GPS) integrated within the device to resolve the current location. Here, the device is one of: a mobile device, a tablet, a phone, and a wearable processing device.

At 320, the device agent obtains criteria for a retail good as supplied by a user. That is, the user defines the criteria for the retail good.

According to an embodiment, at 321, the device agent interacts with a user operating the device to define the criteria.

In an embodiment of 321 and at 322, the device agent identifies rankings, priorities, and exclusions for retail goods in the criteria.

At 330, the device agent sends the current location and the criteria to an assistance manager over a network connection.

At 340, the device agent presents within a screen on a display of the device a listing in prioritized order of retail goods that spans multiple retailers within a geographical range defined with the criteria.

In an embodiment, at 341, the device agent assembles the criteria from a profile associated with the user and at least one additional profile supplied by the user but associated with a different user.

In an embodiment, at 342, the device agent inserts one or more retail advertisements relevant to the listing in the prioritized order.

In an embodiment of 342 and at 342, the device agent tracks selections made by the user with respect to one or more retail advertisements and entries in the listing.

Figure 4:
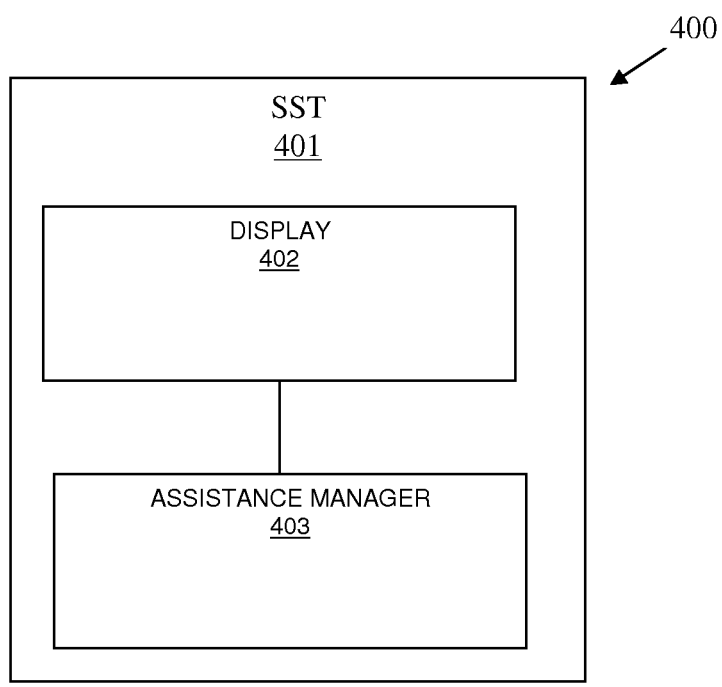
FIG. 4 is a diagram of a retail decision making system, according to an example embodiment.

FIG. 4 is a diagram of a retail decision making system 400, according to an example embodiment. Some components of the retail decision making system 400 are implemented as executable instructions and programmed within a non-transitory computer-readable (processor-readable) storage medium that execute on one or more processors of a Self-Service Terminal (SST); the processors are specifically configured to execute the components of the retail decision making system 400. The retail decision making system 400 is also operational over one or more networks; any such networks may be wired, wireless, or a combination of wired and wireless.

The retail decision making system 400 includes an SST 401 having a display 402 and an SST agent 403.

In an embodiment, the SST 401 is the device 120 of the FIG. 1.

In an embodiment, the SST 401 is a kiosk.

In an embodiment, the SST 401 is a POS device.

In an embodiment, the display 402 is a touch screen.

The SST agent 403 executes on one or more processors of the SST 401 as executable instructions residing in memory and/or non-transitory computer-readable storage media.

The SST agent 403 is configured and adapted to: execute on the SST 401, present an interface to a consumer within a screen on the display 402 to receive criteria for a retail good or service, request an aggregated listing of goods and services from multiple retailers that agree with the criteria from a remote assistance manager, and present the aggregated listing within the screen on the display 402 for the consumer to interact with.

In an embodiment, the SST agent 403 is the method 300 of the FIG. 3.

In an embodiment, the SST agent 403 is the device application 122 of the FIG. 1.

In an embodiment, the remote assistance manager is the assistance manager 111 of the FIG. 1.

In an embodiment, the remote assistance manager is the method 200 of the FIG. 2.

According to an embodiment, the SST agent 403 is further adapted and configured to interpose one or more retail advertisements in the screen relevant to entries for the aggregated listing.

In an embodiment of the latter embodiment, the SST agent 403 is further adapted and configured to track and report selections made by the consumer with respect to the one or more retail advertisements and the entries for the aggregated listing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a hardware processor of a server from a non-transitory computer-readable storage medium causing the hardware processor to perform processing comprising:
providing an interface to a user device operated by a user;
registering the user and the user device;
receiving profile information and establishing a profile for the user based on the profile information, wherein receiving further includes receiving through the interface from the customer the profile information as indications for: desired foods, prioritized foods, desired goods, prioritized goods, desired restaurants, prioritized restaurants, desired services, prioritized services, foods to avoid, specific restaurants to avoid, services to avoid, and a geographical range for restricting search results based on user-initiated searches when requested by the user, wherein receiving further includes customizing the profile based on customer interaction through the interface;
obtaining the profile information from the profile upon receipt of search terms associated with a search provided by the user through the interface and identifying the geographical range;
receiving a request for a good from the search terms of the search along with a current location of the user device, wherein receiving further includes identifying the request with the search as a specific one of the search terms, wherein receiving further includes receiving a second profile associated with a different user as another one of the search terms, wherein the second profile is customized and defined by the different user, wherein receiving further includes receiving the search terms including the second profile of the different user from the user device of the user through the interface, wherein the second profile of the different user obtained from a second user device of the second user directly through wireless communication by the user device;
aggregating a listing of goods that spans multiple retailers that are located within the geographical range of the current location based on the profile and the second profile when specific search results are available, wherein aggregating further includes generating the listing as an aggregated menu, each entry within the aggregated menu comprising: a name of the corresponding retailer, a name for the corresponding good, an estimated expense associated with the corresponding good, ratings for the corresponding good, and a travel distance from the current location to a retailer location of the corresponding retailer where the corresponding good is offered, and directions from the current location to the retailer location, and requesting that the user and the different user modify the search terms when there are no specific search results available; and
delivering the entries of the aggregated menu in a user-defined priority order defined in the profile and the second profile to the user device for viewing by the user within the interface.

2. The method of claim 1, wherein aggregating further includes filtering the listing of goods based on the profile information defined in the profile.

3. The method of claim 2, wherein filtering further includes identifying a ranking, a priority, and exclusions for user-defined goods in the profile information of the profile.

4. The method of claim 1, wherein aggregating further includes obtaining criteria for aggregating the listing of goods from the user through the interface.

5. The method of claim 1, wherein aggregating further includes changing the geographic range to a new geographical range based on information provided by the user with the request of the search through the interface.

6. The method of claim 1 further comprising one or more offers or one or more retail advertisements based on the listing in a user-defined priority order within the interface.

7. A method, comprising:
providing executable instructions to a hardware processor of a device from a non-transitory computer-readable storage medium causing the hardware processor to perform processing comprising:

resolving a current location for the device;

associating a profile associated with a user that operates the device;

acquiring a second profile wirelessly from a second device operated by a different user;

obtaining criteria for a retail good from the user through an interface and modifying the criteria by including the profile and the second profile in the criteria, wherein obtaining further includes obtaining the criteria as a search provided by the user through the interface with the criteria including a geographical range that defines a geographical distance from the current location for which search results for the search are to be provided, wherein the profile defined and customized by the user and the second profile defined and customized by the different user;

sending the current location and the criteria to an assistance manager over a network connection through the interface;

receiving, by the processor from the assistance manager based on the sending, an aggregated menu comprising entries when specific search results are available, each entry comprising: a name of a corresponding retailer offering a corresponding good, a name for the corresponding good, an estimated expense associated with the corresponding good, ratings for the corresponding good, and a travel distance from the current location to a retailer location of the corresponding retailer where the corresponding good is offered, and directions from the current location to the retailer location, and requesting that the user and the different user modify the criteria for conducting a different search when there are no specific search results available;

presenting, by the processor within a screen on a display of the device and within the interface, the entries of the aggregated menu in prioritized order of retail goods that spans multiple retailers within the geographical range of the current location, wherein the aggregated menu is responsive to the profile registered to the user that is operating the device and the second profile associated with the different user operating the second device; and identifying, by the processor from the profile, user customized settings for the user that includes:

desired foods, prioritized foods, desired goods, prioritized goods, desired restaurants, prioritized restaurants, desired services, prioritized services, foods to avoid, specific restaurants to avoid, services to avoid, and an initial user-defined geographical range for providing searches when requested by the user.

8. The method of claim 7, wherein resolving further includes identifying the current location based on a predefined location assigned to the device, wherein the device is one of:

a kiosk and a Point-Of-Sale (POS) device.

9. The method of claim 7, wherein resolving further includes using a Global Positioning Satellite integrated within the device to resolve the current location.

10. The method of claim 7, wherein obtaining further includes interacting with the user operating the device to define the criteria through the interface.

11. The method of claim 10, wherein interacting further includes identifying rankings, priorities, and exclusions for retail goods from the profile and the second profile.

12. The method of claim 7, wherein presenting further includes assembling the criteria from the profile associated with the user and the second profile associated with the different user of the second device.

13. The method of claim 7, wherein presenting further includes inserting one or more retail advertisements relevant to the aggregated menu in the prioritized order.

14. The method of claim 13, wherein presenting further includes tracking selections made by the user with respect to the one or more retail advertisements and the entries in the aggregated menu through the interface.

15. A system comprising:

a Self-Service Terminal (SST);

a display of the SST;

a hardware processor;

a non-transitory computer-readable storage medium having executable instructions representing a SST agent; and the SST agent executed by the hardware processor from the non-transitory computer-readable storage medium causing the hardware processor to perform operations comprising:

presenting an interface to a consumer within a screen on the display to:

a) register a profile of a consumer with customized settings that include: desired foods, prioritized foods, desired goods, prioritized goods, desired restaurants, prioritized restaurants, desired services, prioritized services, foods to avoid, specific restaurants to avoid, services to avoid, and an initial geographical range for restricting search results for searches when requested by the user, and b) receive criteria for a retail good or service, wherein the criteria including a second profile for a different user to include with the criteria, wherein the profile defined and customized by the user and the second profile defined and customized by the second user, wherein the first and second profile provided from a mobile device operated by the user, the mobile device of the user wirelessly obtaining the second profile from a second mobile device operated by the second user;

requesting an aggregated listing of goods and services from multiple retailers that agree with the criteria when specific search results are available and based on both the profile and the second profile from a remote assistance manager and at least a portion of the criteria defining a geographical range from a current location of the SST, the geographical range modifies the initial geographical range defined in the profile and the criteria provided as a search by the consumer, and requesting that the user and the second user revise the criteria for a different search when there are none of the specific search results available;

receiving, from the remote assistance manager, an aggregated menu comprising entries, each entry comprising: a name of a corresponding retailer offering a corresponding good, a name for the corresponding good, an estimated expense associated with the corresponding good, ratings for the corresponding good, and a travel distance from the current location to a retailer location of the corresponding retailer where the corresponding good is offered, and directions from the current location to the retailer location and presenting the entries of the aggregated menu within the screen on the display for the consumer to interact with through the interface based on both the profile and the second profile.

16. The system of claim 15, wherein the SST agent when executed by the hardware processor from the non-transitory computer-readable storage medium further causes the hardware processor to:
    interpose one or more retail advertisements in the screen relevant to entries for the aggregated menu.

17. The system of claim 16, wherein the SST agent when executed by the hardware processor from the non-transitory computer-readable storage medium further causes the hardware processor to:
    track and report selections made by the consumer within the interface and with respect to the one or more retail advertisements and the entries for the aggregated menu.

* * * * *